(12) United States Patent
Zhang (10) Patent No.: US 12,009,542 B2
(45) Date of Patent: Jun. 11, 2024

(54) BATTERY PACK AND ELECTRIC VEHICLE

(71) Applicant: Dongguan Poweramp Technology Limited, Dongguan (CN)

(72) Inventor: Haifei Zhang, Dongguan (CN)

(73) Assignee: Dongguan Poweramp Technology Limited, Dongguan (CN)

( * ) Notice: Subject to any disclaimer, the term of this patent is extended or adjusted under 35 U.S.C. 154(b) by 565 days.

(21) Appl. No.: 17/281,358

(22) PCT Filed: Jun. 18, 2020

(86) PCT No.: PCT/CN2020/096840
§ 371 (c)(1),
(2) Date: Mar. 30, 2021

(87) PCT Pub. No.: WO2021/253330
PCT Pub. Date: Dec. 23, 2021

(65) Prior Publication Data
US 2022/0200092 A1    Jun. 23, 2022

(51) Int. Cl.
*H01M 50/30* (2021.01)
*B60L 50/64* (2019.01)
(Continued)

(52) U.S. Cl.
CPC ............ *H01M 50/30* (2021.01); *B60L 50/64* (2019.02); *H01M 10/425* (2013.01);
(Continued)

(58) Field of Classification Search
CPC ................. B60L 50/64; H01M 10/425; H01M 2010/4271; H01M 2220/20;
(Continued)

(56) References Cited

U.S. PATENT DOCUMENTS 8,449,999 B2   5/2013 You et al.
2010/0266881 A1  10/2010 You et al.
(Continued)

FOREIGN PATENT DOCUMENTS

CN    101663779 A    3/2010
CN    206490119 U *  9/2017  .............. H01M 2/08
(Continued)

OTHER PUBLICATIONS

Machine translation CN209401662U (Year: 2019).*
(Continued)

*Primary Examiner* — Victoria H Lynch
(74) *Attorney, Agent, or Firm* — WHDA, LLP (57) ABSTRACT

A battery pack includes a housing, a battery cell assembly, a first separator, a pressure relief portion, and glue. The first separator is disposed between the housing and a first side of the battery cell assembly, and is deformed when a temperature is higher than a first threshold. The glue fills a clearance between the housing and at least a partial area outside the first side of the battery cell assembly and is configured to fasten the battery cell assembly to the housing. When thermal runaway occurs in the battery pack, the first separator is thermally deformed to form a first pressure relief channel between the housing and the first side of the battery cell assembly. Then, high-temperature gas can smoothly escape from the battery pack through the first pressure relief channel and the pressure relief portion.

19 Claims, 10 Drawing Sheets

(51) Int. Cl.
*H01M 10/42* (2006.01)
*H01M 50/209* (2021.01)
*H01M 50/289* (2021.01)

(52) U.S. Cl.
CPC ....... *H01M 50/209* (2021.01); *H01M 50/289* (2021.01); *H01M 2010/4271* (2013.01); *H01M 2220/20* (2013.01)

(58) Field of Classification Search
CPC ............ H01M 50/186; H01M 50/209; H01M 50/242; H01M 50/249; H01M 50/289; H01M 50/293; H01M 50/30; H01M 50/3425; Y02E 60/10
See application file for complete search history.

(56) References Cited

U.S. PATENT DOCUMENTS

2014/0162114 A1* 6/2014 Suzuki .............. H01M 10/6555
429/163
2019/0020001 A1 1/2019 Nakano et al.

FOREIGN PATENT DOCUMENTS

| CN | 206490119 U | | 9/2017 | | |
|---|---|---|---|---|---|
| CN | 108232064 A | | 6/2018 | | |
| CN | 108604653 A | | 9/2018 | | |
| CN | 207818695 U | | 9/2018 | | |
| CN | 209401662 U | * | 9/2019 | .......... | H01M 50/204 |
| CN | 209981287 U | | 1/2020 | | |
| JP | 2015228286 A | | 12/2015 | | |
| WO | WO-2018157557 A1 | * | 9/2018 | .............. | H01M 2/08 |

OTHER PUBLICATIONS

Machine translation WO2018157557A1 (Year: 2018).*
International Search Report dated Mar. 23, 2021, issued in counterpart Application No. PCT/CN2020/096840. (4 pages).
Written Opinion dated Mar. 23, 2021, issued in counterpart Application No. PCT/CN2020/096840. (5 pages).

* cited by examiner

BATTERY PACK AND ELECTRIC VEHICLE

CROSS REFERENCE TO THE RELATED APPLICATIONS

The present application is a National Stage application of PCT international application: PCT/CN2020/096840, filed on 18 Jun. 2020, the disclosure of which is hereby incorporated by reference in its entirety.

TECHNICAL FIELD

Embodiments of this application relate to the field of battery technologies, and in particular, to a battery pack and an electric vehicle.

BACKGROUND

A battery pack is an apparatus that converts external energy into electric energy and stores the electric energy in the battery pack, to supply power to an external device when needed. Typically, the battery pack includes a battery cell assembly, a battery management assembly, and a housing used for accommodating the two assemblies. As a core component, the battery cell assembly typically includes a plurality of battery cells that are disposed adjacently and connected in series (or in parallel), and the plurality of battery cells can work together to output expected power.

To ensure that the battery cell assembly can be stably mounted in the housing without displacement, some manufacturers use glue such as potting glue and silicone to pot the battery pack, so that the glue fills in between an outer surface of the battery cell assembly and an inner wall of the housing, and the entire battery cell assembly is fixed inside the housing, thereby overcoming a defect of displacement of the battery cell assembly in the housing. However, the inventor of this application found during implementation of this application that when an exception incident such as a short circuit or overcharging occurs in the internal battery cell assembly of the potted battery pack, thermal runaway may occur in the battery cell assembly to generate high-temperature gas, and the high-temperature gas is difficult to escape in a timely manner because the battery cell assembly is in a sealed state after potting processing. Therefore, thermal runaway of the potted battery pack possibly leads to an accident such as explosion of the battery pack.

SUMMARY

Embodiments of this application are intended to provide a battery pack and an electric vehicle, to resolve the existing technical problem that high-temperature gas cannot be released in a timely manner when thermal runaway occurs in a battery cell assembly of a potted battery pack.

An embodiment of this application uses the following technical solution to resolve the technical problem:

A battery pack includes a housing, a battery cell assembly, a first separator, a pressure relief portion, and glue. The housing is provided with an accommodating cavity. The battery cell assembly includes a plurality of stacked battery cells and accommodated in the accommodating cavity. The first separator is disposed between the housing and a first side of the battery cell assembly, and is deformed when a temperature is higher than a first threshold. The pressure relief portion is disposed in the housing, and the pressure relief portion comes in contact with the first separator or an air channel is provided between the pressure relief portion and the first separator. The glue fills a clearance between the housing and at least a partial area outside a first side of the battery cell assembly and is configured to fasten the battery cell assembly to the housing.

In a further improvement solution of the foregoing technical solution, the battery cell includes an electrode assembly, a packaging bag, and a first tab, the electrode assembly is disposed inside the packaging bag, the first tab extends from the packaging bag, the packaging bag is provided with a weakness portion, and the weakness portion is disposed between the first separator and the electrode assembly.

In a further improvement solution of the foregoing technical solution, the packaging bag is provided with a sealing portion, the sealing portion includes a first sealing portion, the first tab extends out of the packaging bag from the first sealing portion, and the weakness portion includes a first weakness portion disposed at the first sealing portion.

In a further improvement solution of the foregoing technical solution, the housing includes a bottom wall and a plurality of side walls, the bottom wall and the plurality of side walls form the accommodating cavity, and the first separator is disposed between the battery cell assembly and the side wall.

In a further improvement solution of the foregoing technical solution, the first separator shrinks when the temperature of the first separator is higher than the first threshold.

In a further improvement solution of the foregoing technical solution, the battery pack includes a circuit board and a mounting bracket that are accommodated in the accommodating cavity, the circuit board is fixed to the mounting bracket, and the air channel includes a first air channel disposed on the mounting bracket.

In a further improvement solution of the foregoing technical solution, the mounting bracket includes a first bracket and a second bracket, both the circuit board and the second bracket are fixed to the first bracket, a clearance is provided between the first bracket and the second bracket, the battery pack includes a flexible circuit board that is connected to the battery cell, the flexible circuit board passes through the clearance and is fixed to the circuit board, and the first air channel is disposed on the first bracket and/or the second bracket.

In a further improvement solution of the foregoing technical solution, the battery cell assembly includes a separator disposed between the battery cells, and the separator is capable of preventing passage of the glue.

In a further improvement solution of the foregoing technical solution, the pressure relief portion is a pressure relief hole provided in or an explosion-proof structure disposed in the housing, and the explosion-proof structure includes an explosion-proof piece.

In a further improvement solution of the foregoing technical solution, the pressure relief hole includes a display light hole and/or a key hole that is provided in the housing and communicates with the accommodating cavity.

The embodiments of this application further use the following technical solution to resolve the technical problem:

an electric vehicle, including the foregoing battery pack.

Beneficial Effects of this Application are

The battery pack according to the embodiments of this application includes the housing, the battery cell assembly, the first separator, the pressure relief portion, and the glue. The housing is provided with an accommodating cavity. The battery cell assembly is disposed in the accommodating cavity and includes a plurality of battery cells. The first separator is disposed between the housing and the first side of the battery cell assembly, and is deformed when the temperature is higher than the first threshold. The glue fills the clearance between the housing and at least the partial area outside the first side of the battery cell assembly and is configured to fasten the battery cell assembly to the housing. Compared with existing battery packets on the market, when thermal runaway occurs in the battery pack according to the embodiments of this application, the first separator is thermally deformed to form a first pressure relief channel between the housing and the fast side of the battery cell assembly. Then, high-temperature gas can escape from the battery pack through the first pressure relief channel and the pressure relief portion. This avoids a drawback that the high-temperature gas cannot escape in a timely manner when thermal runaway occurs in the battery cell assembly, and eliminates a hidden danger of explosion of the battery pack.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application.

DETAILED DESCRIPTION OF EMBODIMENTS

For ease of understanding this application, the following describes this application in detail with reference to accompanying drawings and specific embodiments. It should be noted that when an element is expressed as being "fastened/fixed" to another element, it may be directly fastened/fixed to the another element or one or more intermediate elements may be present. When an element is expressed as being "connected" to another element, it may be directly connected to the another element or one or more intermediate elements may be present. The terms "vertical", "horizontal", "left", "right", "inside", "outside", and similar expressions used in this specification are merely for description purposes.

Unless otherwise defined, all technical and scientific terms used in this specification shall have the same meanings as commonly understood by those skilled in the art to which this application belongs. The terms used in this specification of this application are merely intended to describe specific embodiments but not intended to constitute any limitation on this application. The term "and/or" used in this specification includes any and all combinations of one or more relevant listed items.

In addition, technical features in different embodiments of this application described below can be combined with each other as long as they do not conflict with each other.

In this specification. "installing" includes fixing or limiting an element or apparatus to a specific location or place by means of welding, screwing, clamping, bonding, or the like. The element or apparatus may stay still at the specific position or place, or may move within a limited range. After being fixed or limited to the specific position or place, the element or apparatus can be disassembled or cannot be disassembled. This is not limited in the embodiments of this application.

Figure 1:
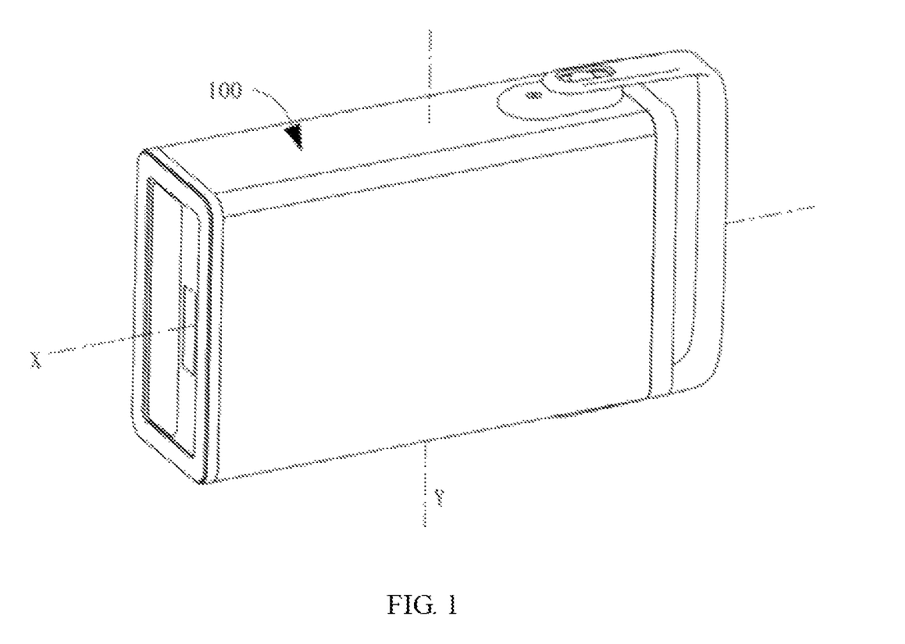
FIG. 1 is a three-dimensional diagram of a battery pack according to an embodiment of this application.
Figure 2:
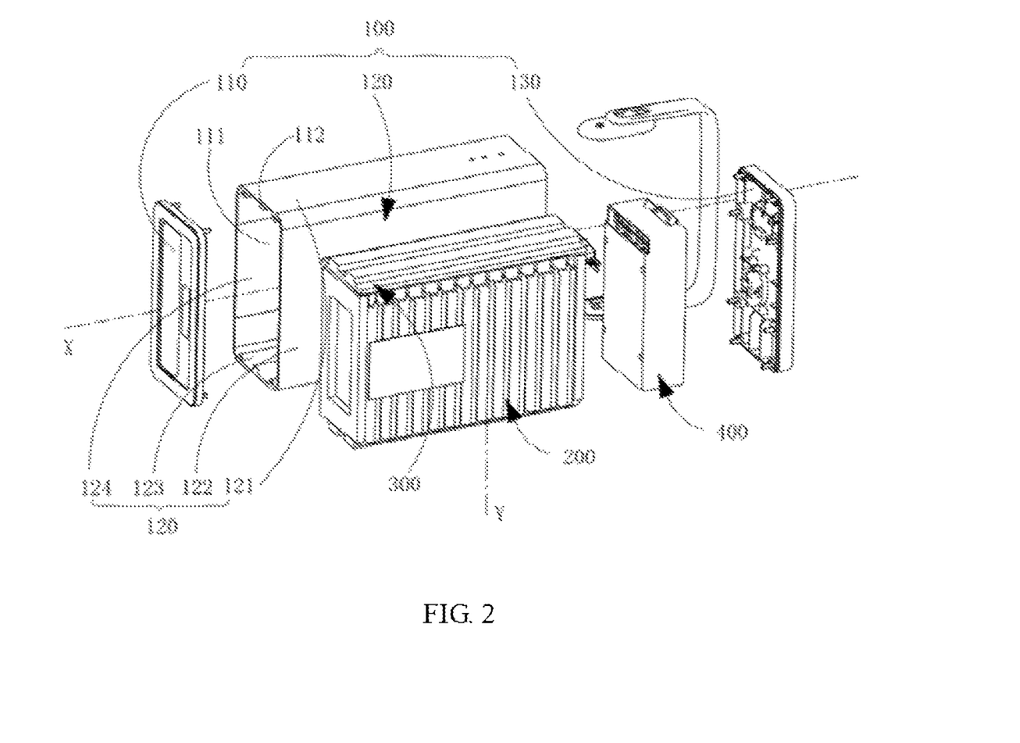
FIG. 2 is a schematic exploded view of the battery pack in FIG. 1.

FIG. 1 and FIG. 2 respectively show a three-dimensional diagram and a schematic exploded view of a battery pack according to this application. The battery pack includes a housing 100, a battery cell assembly 200, a first separator 300, a pressure relief portion (not shown), glue (not shown), and a battery management assembly 400. The housing 100 is provided with an accommodating cavity 111. The battery cell assembly 200 is accommodated in the accommodating cavity 111 and includes a plurality of battery cells 210. The first separator 300 is disposed between a first side of the battery cell assembly 200 and the housing 100, and is deformed when a temperature is higher than a first threshold. In this embodiment, the first threshold is lower than a thermal runaway temperature of the battery cell assembly 200. The pressure relief portion is disposed in the housing 100, and the pressure relief portion comes in contact with the first separator 300 or an air channel is provided between the pressure relief portion and the first separator 300. The glue fills a clearance between the housing 100 and at least a partial area outside the first side of the battery cell assembly 200 and is configured to fasten the battery cell assembly 200 to the housing 100. It should be noted that "a plurality of" described in this application means more than two.

For the housing 100, specifically refer to FIG. 2. The housing 100 includes a bottom wall 110, a plurality of side walls 120, and a top wall 130. The entire bottom wall 110 presents a plate structure. The plurality of side walls 120 form a hollow cuboid enclosure that extends along a first direction X. One end of the plurality of side walls 120 is fixed to the bottom wall 110 and forms an enclosure with the bottom wall 110 to from the accommodating cavity 111. In this embodiment, the plurality of side walls 120 are specifically a first side wall 121, a second side wall 122, a third side wall 123, and a fourth side wall 124. These four side walls are sequentially connected and form the cuboid enclosure. The top wall 130 is disposed at one end of the plurality of side walls 120 that faces away from the bottom wall 110, and basically closes an opening of the accommodating cavity 111.

Figure 3:
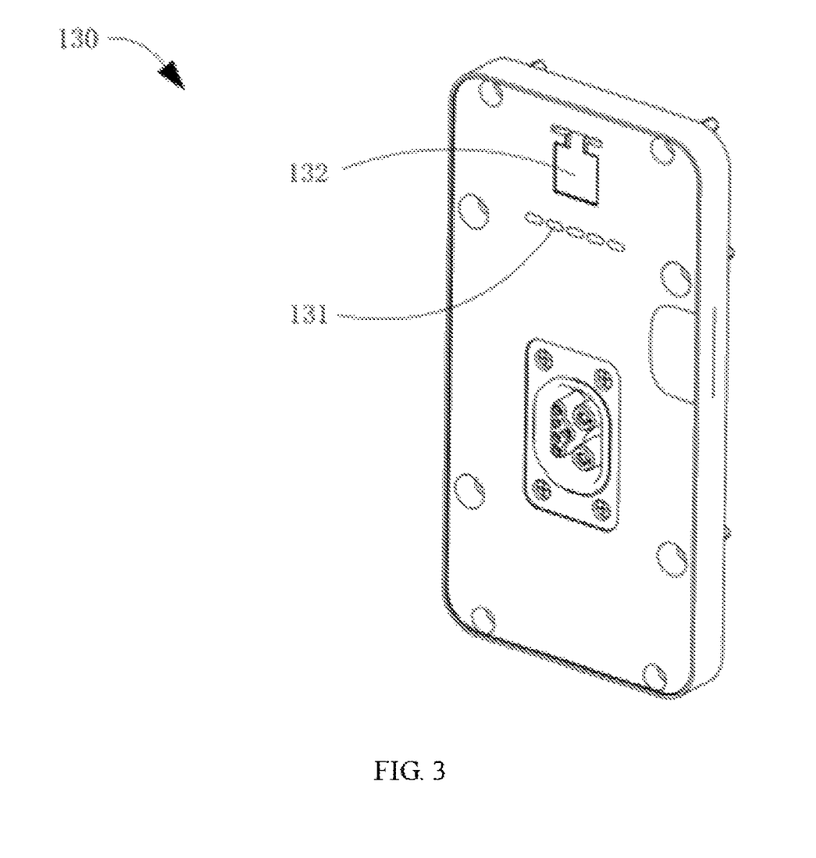
FIG. 3 is a three-dimensional diagram of a top wall in FIG. 2.
Figure 4:
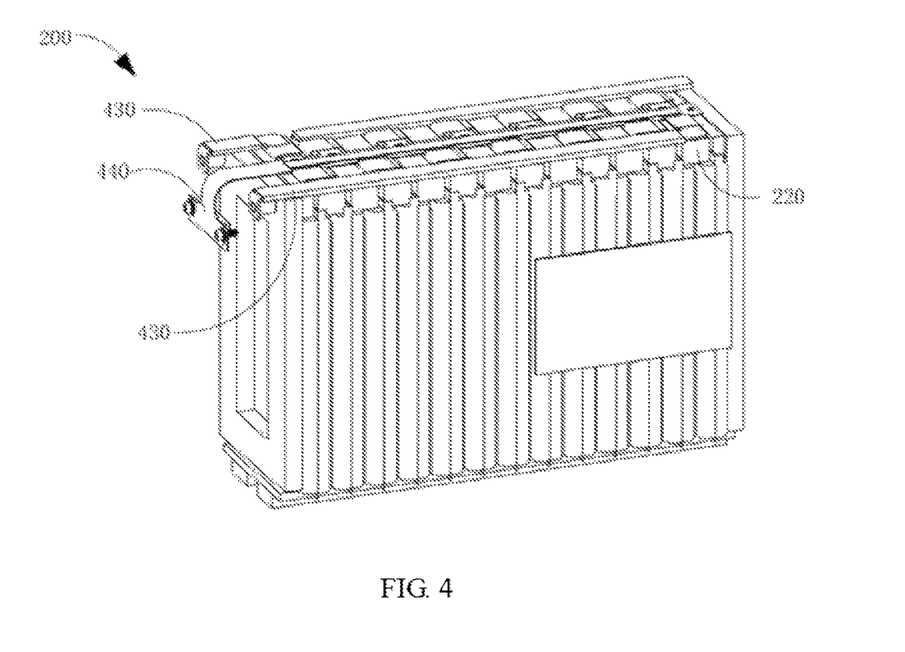
FIG. 4 is a three-dimensional diagram of a battery cell assembly in FIG. 2.
Figure 5:
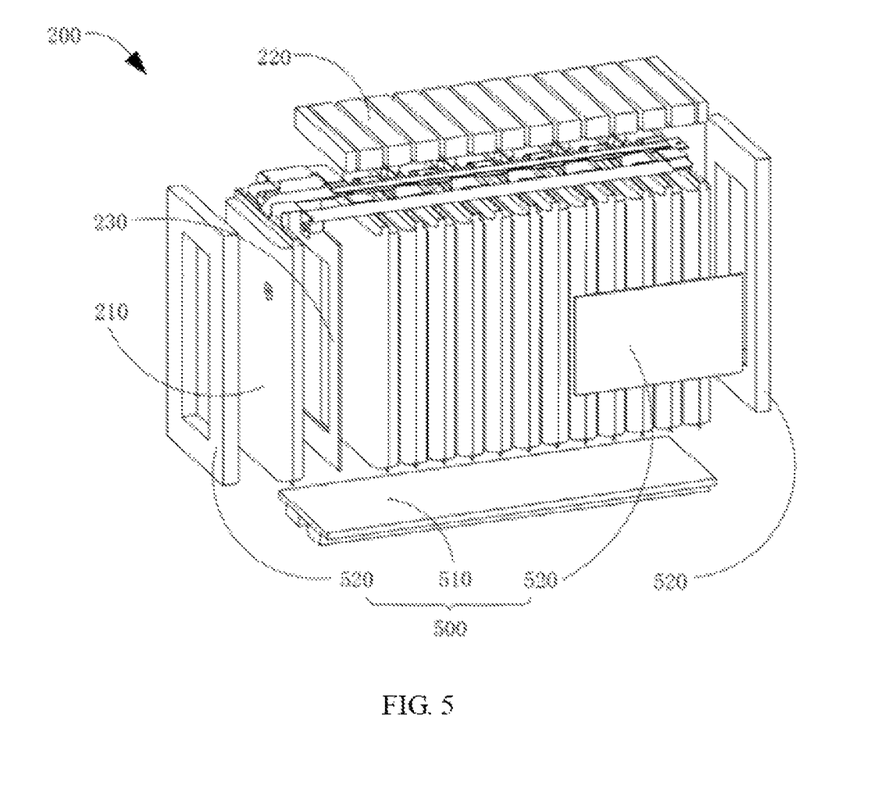
FIG. 5 is an exploded diagram of the battery cell assembly in FIG. 2.

For the battery cell assembly 200, specifically refer to FIG. 4 and FIG. 5 that respectively show a three-dimensional diagram and a schematic exploded view of the battery cell assembly 200. Also with reference to FIG. 1 to FIG. 3, the battery cell assembly 200 includes a plurality of battery cells 210 that are sequentially stacked along the first direction X. The first side of the battery cell assembly 200 faces the first side wall 121 of the housing 100, and the first separator 300 is disposed between the battery cell assembly 200 and the first side wall 121.

Figure 6:
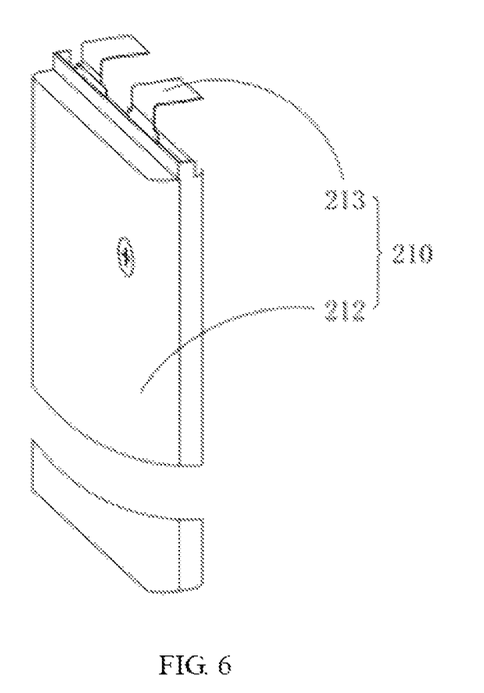
FIG. 6 is a three-dimensional diagram of a battery cell in FIG. 2.
Figure 7:
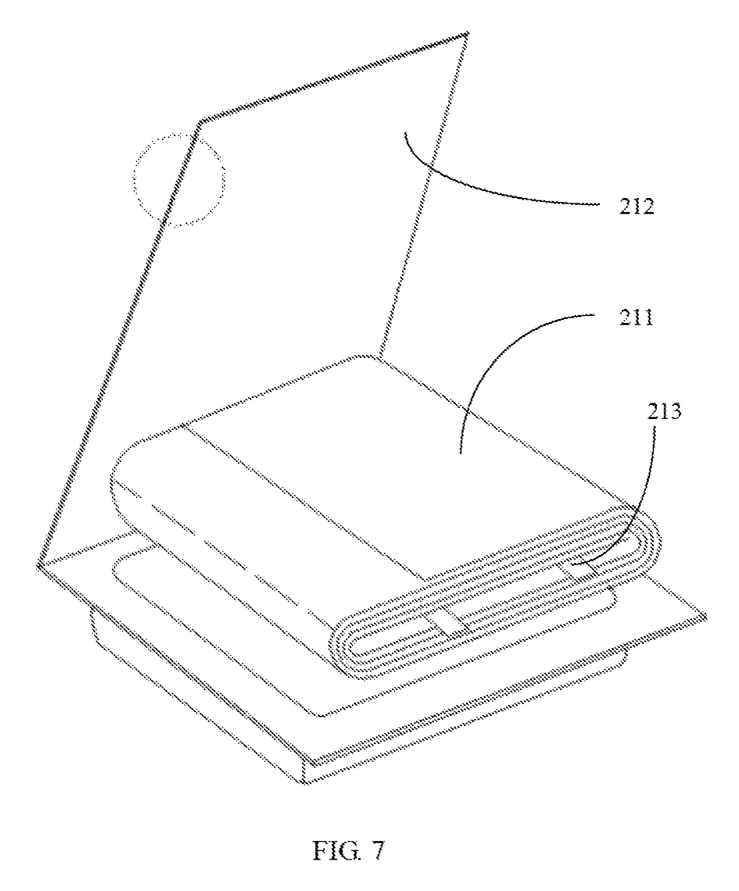
FIG. 7 is a stretch-out view of the battery cell in FIG. 2.

For the battery cell 210, specifically refer to FIG. 6 and FIG. 7 that respectively show a three-dimensional diagram and a stretch-out view of a single battery cell 210. Also with reference to FIG. 4 and FIG. 5, the battery cell 210 includes an electrode assembly 211, a packaging bag 212, and two first tabs 213. The electrode assembly 211 is disposed inside the packaging bag 212. The packaging bag 212 is formed by bending an entire material to wrap the electrode assembly 211 and sealing peripheral areas of the electrode assembly 211 by means of bonding, hot melting, or the like. The sealed area forms the sealing portion (not shown) of the packaging bag 212. To facilitate escaping of high-temperature gas inside the battery cell 210 from a specific position in a timely, targeted, and orderly manner when thermal runaway occurs in the battery cell 210, a weakness portion (not shown) is provided at the sealing portion of the packaging bag 212. Strength of the weakness portion is less than strength of other portions, so that the high-temperature gas generated by the battery cell 210 can quickly break the weakness portion to escape. In this embodiment, the weakness portion is disposed between the first separator 300 and the electrode assembly 211. That is, the weakness portion is disposed between the electrode assembly 211 and the first side wall 121.

One end of the first tab 213 is connected to the electrode assembly 211 and the other end extends from the packaging bag 212. This pair of first tabs 213 includes a positive tab and a negative tab. Optionally, the sealing portion includes a first sealing portion disposed between the electrode assembly 211 and the first separator 300. The first tabs 213 extend out of the packaging bag 212 from the first sealing portion, and the weakness portion includes a first weakness portion disposed at the first sealing portion. In this embodiment, a side of the battery cell assembly 200 on which the first tabs 213 are disposed is the first side of the battery cell assembly 200 in this embodiment, and both the first weakness portion and the first tabs 213 are disposed on the first side. For ease of description, a side of the battery cell assembly 200 that faces away from the first tabs 213 is a second side of the battery cell assembly 200. Each of the first tabs 213 includes a connection portion and a bending portion. One end of the connection portion is connected to the electrode assembly 211 and the other end passes through the packaging bag 212 and extends away from the packaging bag 212 along a second direction Y. One end of the bending portion is connected to an end of the connection portion that faces away from a body and the other end extends along the first direction X. Between any two adjacent battery cells 210, bending portions of two mutually opposite first tabs extend towards opposite directions. A pair of bending portions of two adjacent battery cells 210 that are mutually close overlap and are secured by welding.

In this embodiment, the battery cells 210 are connected in series and the first tabs 213 that are opposite between the battery cells 210 are of opposite polarity. It can be understood that in another embodiment of this application, the battery cells 210 may alternatively be connected in parallel. In this case, it is merely necessary to set the mutually connected first tabs to the same polarity on the foregoing basis, connect positive first tabs by using a copper bar, and connect negative first tabs by using another copper bar.

Further, to prevent deformation of the bending portion due to proneness to damages during dangling, the battery cell assembly 200 further includes a first support 220. For details, refer back to FIG. 4 and FIG. 5. Also with reference to other accompanying drawings, the first support 220 is disposed on an end of the packaging bag 212 that is close to the first separator 300 and abuts against the packaging bag 212. Along the first direction X, one first support 220 abuts against the packaging bags 212 of two battery cells 210 at the same time. The bending portion of the first tab 213 is borne on an end of the first support 220 that faces away from the packaging bag 212. Optionally, the first support 220 is foam and the foam is an air-permeable structure. The first support 220 can be used to bear the bending portion of the first tab 213, and can also allow passage of high-temperature gas generated by the battery cells 210.

Figure 8:
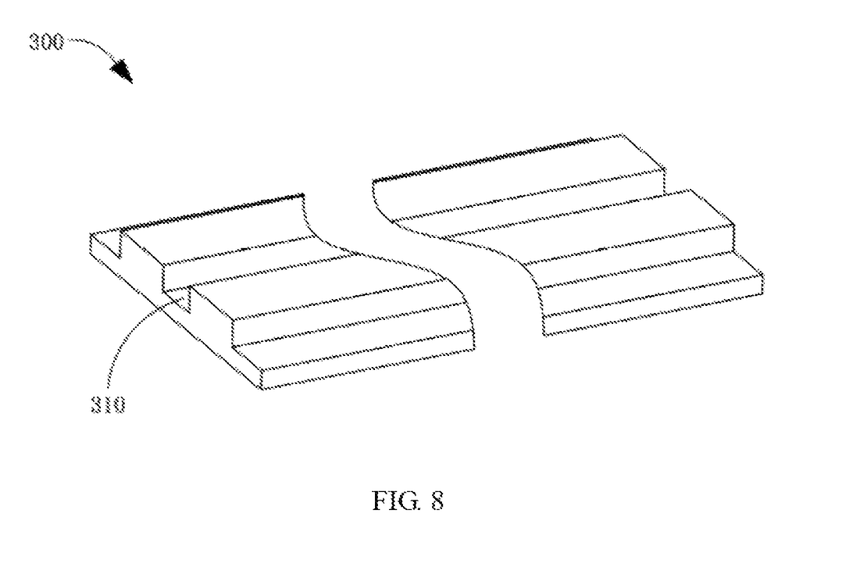
FIG. 8 is a three-dimensional diagram of a first separator in FIG. 2.

For the first separator 300, specifically refer to FIG. 8 that shows a three-dimensional diagram of the first separator 300. Also with reference to other accompanying drawings, the entire first separator 300 presents a flat plate or sheet structure, is accommodated in the accommodating cavity 111 and disposed between the first side and the first side wall 121, and basically covers the first side of the battery cell assembly 200. In this embodiment, two ends of the first separator 300 respectively abut against the first side of the battery cell assembly 200 and the side wall 120 of the housing along the second direction Y, to ensure that the first separator 300 is compactly mounted between the housing 100 and the battery cell assembly 200 and prevent the first separator 300 from freely moving. In another embodiment, the first separator 300 may be bonded to the battery cell assembly or the side wall. A temperature at which the first separator 300 is deformed is a first threshold. The first separator 300 is thermally deformed at a temperature higher than the first threshold, so that a first pressure relief channel is formed between the first side of the battery cell assembly 200 and the housing 100. The first threshold is lower than a thermal runaway temperature of the battery cell assembly 200. It should be noted that a specific representation form of "deformation" of the first separator 300 may be volume shrinking, melting, or gasification of the first separator 300. In this embodiment, the first separator 300 shrinks when heated. Optionally, the first separator 300 is made of a fusible material. Further optionally, the first separator 300 is made of foam with a relatively low melting point and the foam has elasticity. Therefore, the first separator 300 can implement a gas release and explosion resistance function when thermal runaway occurs in the battery cell assembly, and can also implement a buffer and shock resistance function when the battery pack operates normally, avoiding a strong impact on the battery cell assembly 200. Certainly, persons skilled in the art may also make adaptive changes to the first separator 300 on the basis of the foregoing embodiment, provided that the first separator 300 can be deformed under the action of the high-temperature gas and the first pressure relief channel is formed between the first side and the housing. For example, in other embodiments of this application, the first separator is a bubble bag.

A limiting groove 310 is disposed at an end of the first separator 300 that faces away from the battery cell assembly 200. Correspondingly, a limiting protrusion 112 that fits the limiting groove 310 is disposed at a corresponding position on the first side wall. The limiting protrusion 112 fits the limiting groove 310, to facilitate installation, positioning, and securing of the first separator 300. Optionally, the limiting groove 310 extends along the first direction X. It can be understood that in another embodiment of this application, the limiting groove may alternatively be disposed on an inner wall of the housing. Correspondingly, the limiting protrusion is disposed on the first separator.

The pressure relief portion is disposed in the housing 100 and is thinner than other portions of the housing 100. An air channel is provided between the pressure relief portion and the first separator 300. The pressure relief portion is configured to allow passage of high-temperature gas when the high-temperature gas is generated due to a factor such as thermal runaway in the battery cell assembly 200, so that the high-temperature gas can escape from the housing 100. In this embodiment, the pressure relief portion is a pressure relief hole structure. For details, refer to FIG. 3 that shows a three-dimensional diagram of the top wall 130. A through-hole structure such as a display light hole 131 and a key hole 132 that communicate with the accommodating cavity 111 is disposed on an outer surface of the top wall 130. The pressure relief hole includes the display light hole 131 and/or the key hole 132. The high-temperature gas that escapes from the battery cell assembly 200 sequentially passes through the first pressure relief channel, the air channel, and the pressure relief hole, and escapes out of the housing 100. It can be understood that in another embodiment of this application, the pressure relief portion may alternatively be another structure, provided that the pressure relief portion can allow passage of the high-temperature gas generated by the battery cell assembly. For example, in another embodiment of this application, the pressure relief portion may alternatively be an explosion-proof structure. The explosion-proof structure includes an explosion-proof piece. The high-temperature gas pushes open the explosion-proof piece and flows out of the housing 100. The explosion-proof piece may be a low-strength thin area in the housing 100. The explosion-proof piece may alternatively be a film structure that is opened in the housing 100 and then covered again. The explosion-proof piece may further alternatively be an explosion-proof film structure in an explosion-proof valve installed in the housing 100. In addition, the pressure relief portion may directly come in contact with the first separator. In this case, gas escaping from the battery cell assembly 200 directly passes through the first pressure relief channel and the pressure relief portion and escapes the housing 100. For example, the pressure relief portion may directly come in contact with the first side wall on which the protrusion 112 is disposed in this embodiment.

The glue fills a clearance between the housing 100 and at least a partial area outside the first side of the battery cell assembly 200, to fasten the battery cell assembly 200 to the housing 100. In this embodiment, the glue is potting glue. It can be understood that in another embodiment of this application, the glue may alternatively be another curable fluid material such as foamed adhesive and silicone. This is not limited herein.

In this embodiment, the battery pack further includes a buffer assembly 500. For details, refer to FIG. 5 and other accompanying drawings. The buffer assembly 500 has elasticity to some extent, is disposed between at least a partial area outside the first side of the battery cell assembly 200 and an inner wall of the housing 100, and works with the first separator 300 to maintain the battery cells 210 and the first support 220 at relatively fixed positions. In this embodiment, the buffer assembly 500 can prevent passage of the glue, thereby reducing usage of the glue and decreasing costs. The buffer assembly 500 includes an end buffer 510 and a side buffer 520. The end buffer 510 is disposed between the second side of the battery cell assembly 200 and the inner wall of the housing 100. The side buffer 520 is disposed between the housing 100 and a side between the first side and the second side of the battery cell assembly 200. Optionally, the end buffer 510 and % or the side buffer 520 is foam.

Further, the battery cell assembly 200 further includes a separator 230 disposed between the battery cells 210. Specifically, referring to FIG. 5, the entire separator 230 presents a flat sheet structure and can prevent passage of the glue. Disposition of the separator 230 leaves a safe clearance between two adjacent battery cells 210, and the safe clearance provides some allowance for swelling of the battery cells 210. Optionally, the separator 230 is an elastic piece. When thermal runaway occurs in the battery cell 210, the separator 230 can effectively absorbing swelling of the battery cell 210 through elastic deformation, thereby avoiding a hidden danger of explosion resulting from a deformation failure and excessive air pressure inside the body of the battery cell 210. Further optionally, the separator 230 is an air-permeable structure. After escaping from a center of the battery cell 210, some high-temperature gas passes through the separator 230 to the first support 220, then sequentially passes through the first support 220, the first pressure relief channel, the air channel, and the pressure relief portion, and escapes out of the housing 100. Further optionally, the separator 230 is foam. The foam can allow passage of the high-temperature gas generated by the battery cell assembly, and also prevent passage of potting glue. Further optionally, a hole structure that passes along the first direction X is disposed at a central position of the separator 230. In other words, the entire separator 230 presents a hollow-square shape. The hole structure can reduce resistance of the separator 230 on the high-temperature gas during escaping, thereby implementing better gas release and explosion-proof effects. Similarly, the first separator 300 can prevent passage of the glue to prevent permeating of the glue into the weakness portion from the first separator 300.

Figure 9:
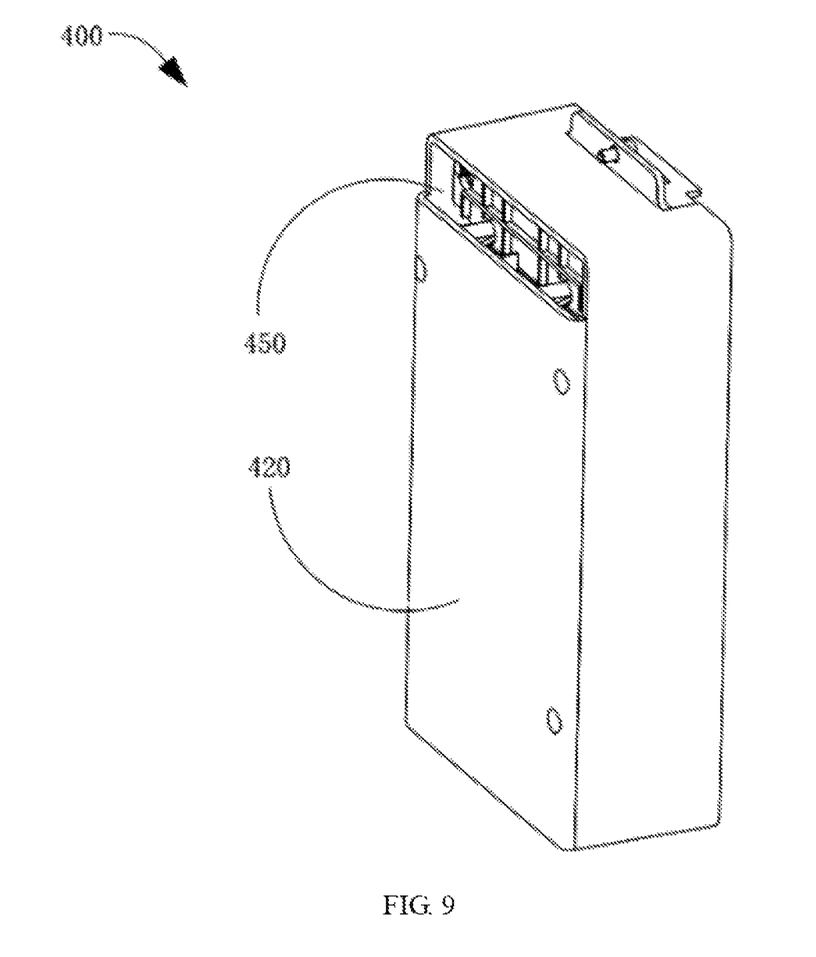
FIG. 9 is a three-dimensional diagram of a battery management assembly in FIG. 2.
Figure 10:
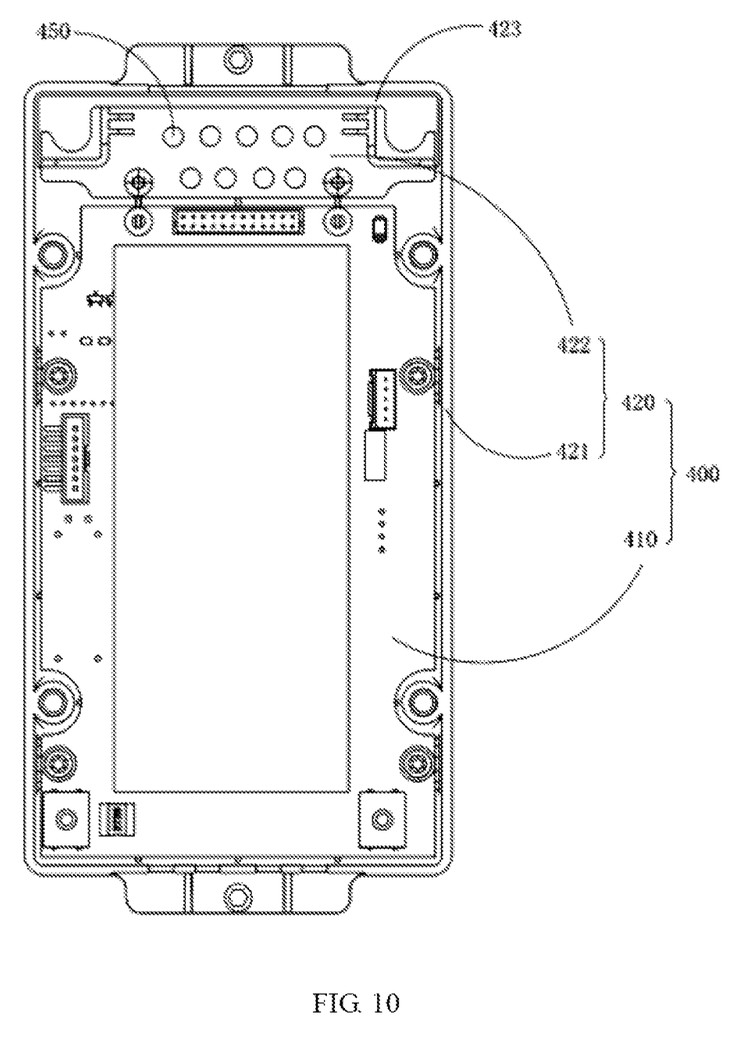
FIG. 10 is a projection diagram of the battery management assembly in FIG. 2 in one direction.

For the battery management assembly 400, refer to FIG. 9 and FIG. 10 that respectively show a three-dimensional diagram and a projection diagram of the battery management assembly 400 in one direction. Also with reference to other accompanying drawings, the battery management assembly 400 is disposed in the accommodating cavity 111 and includes a circuit board 410, a mounting bracket 420, two copper bars 430 (FIG. 4), and a flexible circuit board 440 (FIG. 4). The circuit board 410 is fixed to the mounting bracket 420 and is electrically connected to the battery cell assembly 200. The circuit board 410 is configured to control the battery cell assembly 200 to complete the expected work in due time. The mounting bracket 420 includes a first bracket 421 and a second bracket 422. The first bracket 421 is box-shaped and disposed facing away from the battery cell assembly 200. The first bracket 421 limits an accommodating cavity (not shown) that accommodates the circuit board 410 and the second bracket 422. Along the first direction X, the first bracket 421 is disposed on one side of the battery cell assembly 200 and is located on a path along which the high-temperature gas flows from the first separator 300 to the pressure relief portion. The circuit board 410 is specifically fixed to the first bracket 421. The second bracket 422 is accommodated in the accommodating cavity and fixed to the first bracket 421. A clearance 423 is provided between the second bracket 422 and an end of the first bracket 421 that is close to the first side wall. The second bracket 422 is configured to mount the two copper bars 430. One end of the copper bars 430 located away from the second bracket 422 are connected to a positive electrode or a negative electrode of the battery cell assembly 200. One end of the flexible circuit board 440 are electrically connected to the tab of each battery cell 210, and the other end fast passes through an end of the first bracket 421 that is close to the battery cell assembly 200 and then passes through the clearance 423, and is fixed and electrically connected to the circuit board 410.

To facilitate release of the high-temperature gas, the air channel includes a first air channel 450 disposed on the mounting bracket 420. In this embodiment, the first air channel 450 is disposed on both the first bracket 421 and the second bracket 422, and passes through the first bracket 421 and the second bracket 422 in entirety. Specifically, the first air channel 450 includes a square through-hole disposed on the first bracket 421 and a circular through-hole disposed on the second bracket 422. The circular through-hole communicates with the square through-hole. The high-temperature air escaping from the battery cell assembly 200 sequentially passes through the first pressure relief channel, a partial air channel inside the housing 100, the first air channel, a partial air channel inside the housing 100, and the pressure relief portion, and escapes out of the housing 100. It can be understood that in another embodiment of this application, the first air channel may alternatively be disposed only on the first bracket. When the second bracket is not accommodated in the accommodating cavity of the first bracket, the first air channel may alternatively be disposed only on the second bracket.

The battery pack according to this embodiment of this application includes the housing 100, the battery cell assembly 200, the first separator 300, the pressure relief portion, the glue, and the battery management assembly 400. The housing 100 is provided with the accommodating cavity 111 used to accommodate the battery cell assembly 200. The first separator 300 is disposed between the first side of the battery cell assembly 200 and the inner wall of the housing 100, and is deformed when the temperature is higher than the first preset threshold, so that the first pressure relief channel is formed between the first side of the battery cell assembly 200 and the housing 100. The first preset threshold is lower than the thermal runaway temperature of the battery cell assembly 200. The pressure relief portion is disposed in the housing 100. The glue is provided between the battery cell assembly 200 and the housing 100, and is configured to fill in between the battery cell assembly 200 and the housing 100 and fasten the battery cell assembly 200 to the housing 100. Compared with existing battery packets on the market, when thermal runaway occurs in the battery pack according to this embodiment of this application, the generated high-temperature gas can smoothly escape through the first pressure relief channel and the pressure relief portion. This avoids a drawback that the high-temperature gas cannot escape in a timely manner when thermal runaway occurs in the battery cell assembly, and eliminates the hidden danger of explosion of the battery pack.

It should be understood that even though the first side in the foregoing embodiment is an end of the battery cell assembly 200 on which the first tab 213 is disposed, the first side faces the first side wall 121, which is not limited in this application. In another embodiment, the first side of the battery cell assembly 200 may alternatively face the second side wall 122 rather than the first side wall 121. Accordingly, the first tab 213 still faces the first side wall 121. The first separator 300 is disposed between the second side wall 122 and the battery cell assembly 200. In this case, the first sealing portion and the first weakness portion are still located between the first separator 300 and the electrode assembly 211, except that the first sealing portion and the first weakness portion no longer face the first tab 213. Certainly, a specific arrangement manner of the first separator 300, the first sealing portion, and the first weakness portion may further have other variations, which are not described herein.

Based on the same inventive concept, this application further provides another battery pack. For ease of distinguishing it from the battery pack in the first embodiment, the another battery pack is referred to as a second battery pack, and the battery pack in the first embodiment is referred to as a first battery pack. The second battery pack differs from the fast battery pack mainly in that:

The first battery pack merely includes one first separator 300, a battery cell 210 includes two first tabs 213, and the two first tabs 213 are both disposed at a first side of a battery cell assembly 200.

However, the second battery pack further includes another first separator, and the battery cell 210 includes one first tab and one second tab.

Specifically, the another first separator is disposed between a second side of the battery cell assembly and a third side wall. Optionally, a sealing portion further includes a second sealing portion disposed between the battery cell assembly and the third side wall, and a packaging bag further includes a second weakness portion disposed at the second sealing portion. In other words, at least some of high-temperature gas generated by a single battery cell can escape through the second weakness portion and make the first separator disposed between the battery cell assembly and the third side wall shrink, thereby forming a second pressure relief channel between the battery cell assembly and the third side wall, and make the at least some high-temperature gas escape from the housing sequentially through the air channel and the pressure relief portion.

The first tab is disposed between the battery cell assembly and a first side wall and is of the same structure as the first tab 213 in the first battery pack. The second tab is disposed between the battery cell assembly and the third side wall and is also of the same structure as the first tab 213 in the first battery pack. One end of the second tab is connected to the battery cell assembly and the other end extends out of the packaging bag from the second sealing portion.

Compared with the first battery pack in the first embodiment, in the second battery pack according to this embodiment, a first pressure relief channel and a second pressure relief channel are formed when thermal runaway occurs. High-temperature gas can flow to the pressure relief portion through the first pressure relief channel and the second pressure relief channel, making the gas be exhausted more efficiently. Therefore, the second battery pack has a better explosion-proof effect.

It can be understood that in another embodiment of the second battery pack, the pressure relief portion may alternatively be disposed on the third side wall. Alternatively, there are a plurality of pressure relief portions. At least one pressure relief portion is disposed on a top wall and at least one pressure relief portion is disposed on the third side wall. In addition, in the second battery pack, the first weakness portion and/or the second weakness portion may alternatively be disposed not opposite to the tabs. That is, the first weakness portion and/or the second weakness portion are/or disposed between the electrode assembly and a second side wall 122 (or a fourth side wall 124).

Based on the same inventive concept, this application further provides an energy storage apparatus, including the battery pack in any one of the foregoing embodiments. Because the energy storage apparatus includes the battery pack, the energy storage apparatus can release high-temperature gas in a timely manner when thermal runaway occurs in the battery pack, eliminating a hidden danger of explosion of the battery pack.

Based on the same inventive concept, this application further provides an electric vehicle, including the foregoing energy storage apparatus. That is, the electric vehicle also includes the foregoing battery pack. The electric vehicle can release high-temperature gas in a timely manner when thermal runaway occurs in the battery pack, eliminating a hidden danger of explosion of the battery pack.

Finally, it should be noted that the foregoing embodiments are merely intended to describe the technical solutions of this application, but not intended to constitute any limitation. Under the idea of this application, the foregoing embodiments or technical features in different embodiments can also be combined, steps can be implemented in any order, and there are many other changes in different aspects of the application as described above, which, for the sake of brevity, are not provided in the detail. Although this application is described in detail with reference to the foregoing embodiments, persons of ordinary skill in the art should understand that modifications can be made to the technical solutions of the foregoing embodiments or equivalent replacements can be made to some technical features therein, and these modifications or replacements do not make an essence of the corresponding technical solutions depart from the scope of the technical solutions of the embodiments of this application.

The invention claimed is:

1. A battery pack, comprising:
a housing provided with an accommodating cavity;
a battery cell assembly comprising a plurality of battery cells and accommodated in the accommodating cavity;
a first separator disposed between the housing and a first side of the battery cell assembly, the first separator thermally deforms at a temperature higher than a first threshold so that a first pressure relief channel is formed between the first side of the battery cell assembly and the housing;
a pressure relief portion disposed in the housing, wherein the pressure relief portion is in contact with the first separator or an air channel is provided between the pressure relief portion and the first separator; and
a glue filling a clearance between the housing and at least a partial area outside the first side of the battery cell assembly to fasten the battery cell assembly to the housing;
wherein a battery cell comprises an electrode assembly, a packaging bag, and a first tab; the electrode assembly is disposed inside the packaging bag, the first tab extends from the packaging bag, the packaging bag is provided with a weakness portion, strength of the weakness portion is less than strength of other portions of the packaging bag, and the weakness portion is disposed between the first separator and the electrode assembly.

2. The battery pack according to claim 1, wherein the packaging bag is provided with a sealing portion, the sealing portion comprises a first sealing portion, the first tab extends out of the packaging bag from the first sealing portion, and the weakness portion comprises a first weakness portion disposed at the first sealing portion, strength of the first weakness portion is less than strength of other portions of the packaging bag.

3. The battery pack according to claim 1, wherein the housing comprises a bottom wall and a plurality of side walls, the bottom wall and the plurality of side walls form the accommodating cavity, and the first separator is disposed between the battery cell assembly and one of the plurality of side walls.

4. The battery pack according to claim 1 wherein the first separator is configured to shrink when the temperature of the first separator is higher than the first threshold.

5. The battery pack according to claim 4, wherein the glue comprises potting glue.

6. The battery pack according to claim 4, wherein the first threshold is lower than a thermal runaway temperature of the battery cell assembly.

7. The battery pack according to claim 4, wherein the battery pack further comprises a circuit board and a mounting bracket that are accommodated in the accommodating cavity, the circuit board is fixed to the mounting bracket, and the air channel comprises a first air channel disposed on the mounting bracket.

8. The battery pack according to claim 7, wherein the mounting bracket comprises a first bracket and a second bracket, both the circuit board and the second bracket are fixed to the first bracket, a clearance is provided between the first bracket and the second bracket; the battery pack further comprises a flexible circuit board connected to the battery cell, the flexible circuit board passes through the clearance and is fixed to the circuit board, and the first air channel is disposed on the first bracket and/or the second bracket.

9. The battery pack according to claim 8, further comprising copper bars, the second bracket is configured to mount the copper bars; one end of the copper bars located away from the second bracket is connected to a positive electrode or a negative electrode of the battery cell assembly.

10. The battery pack according to claim 4, wherein the battery cell assembly comprises a separator disposed between the plurality of battery cells, to prevent passage of the glue.

11. The battery pack according to claim 4, wherein the first separator comprises an elastic piece and an air-permeable structure.

12. The battery pack according to claim 1, wherein the pressure relief portion is a pressure relief hole provided in or an explosion-proof structure disposed in the housing, and the explosion-proof structure comprises an explosion-proof piece.

13. The battery pack according to claim 12, wherein the pressure relief hole comprises a display light hole and/or a key hole provided in the housing and communicating with the accommodating cavity.

14. An electric vehicle, comprising the battery pack according to claim 1.

15. A battery pack, comprising:
a housing provided with an accommodating cavity;
a battery cell assembly comprising a plurality of battery cells and accommodated in the accommodating cavity;
a first separator disposed between the housing and a first side of the battery cell assembly, the first separator thermally deforms at a temperature higher than a first threshold so that a first pressure relief channel is formed between the first side of the battery cell assembly and the housing;
a pressure relief portion disposed in the housing, wherein the pressure relief portion is in contact with the first separator or an air channel is provided between the pressure relief portion and the first separator; and
a battery cell comprises an electrode assembly, a packaging bag, and a first tab; the electrode assembly is disposed inside the packaging bag, the first tab extends from the packaging bag, the packaging bag is provided with a weakness portion, strength of the weakness portion is less than strength of other portions of the packaging bag, and the weakness portion is disposed between the first separator and the electrode assembly.

16. The battery pack according to claim 15, wherein the packaging bag is provided with a sealing portion, the sealing portion comprises a first sealing portion, the first tab extends out of the packaging bag from the first sealing portion, and the weakness portion comprises a first weakness portion disposed at the first sealing portion, strength of the first weakness portion is less than strength of other portions of the packaging bag.

17. The battery pack according to claim 16, wherein the first separator is configured to shrink when the temperature of the first separator is higher than the first threshold.

18. The battery pack according to claim 17, further comprising a circuit board and a mounting bracket accommodated in the accommodating cavity, the circuit board is fixed to the mounting bracket, and the air channel comprises a first air channel disposed on the mounting bracket.

19. The battery pack according to claim 18, wherein the mounting bracket comprises a first bracket and a second bracket, both the circuit board and the second bracket are fixed to the first bracket, a clearance is provided between the first bracket and the second bracket, the battery pack further comprises a flexible circuit board connected to the battery cell, the flexible circuit board passes through the clearance and is fixed to the circuit board, and the first air channel is disposed on the first bracket and/or the second bracket.

* * * * *